558-860 OR 3,857,997 SR

United States Patent [19]

Toonder

[11] 3,857,997

[45] Dec. 31, 1974

[54] CABLE CONVERTER WITH PHASE LOCK LOOP TECHNIQUES

[75] Inventor: Pieter Den Toonder, Dordrecht, Netherlands

[73] Assignee: Oak Industries, Inc., Crystal Lake, Ill.

[22] Filed: Mar. 8, 1973

[21] Appl. No.: 339,095

[52] U.S. Cl. ....................... 178/5.1, 325/430, 331/38

[51] Int. Cl. ........................................... H04n 1/44

[58] Field of Search ........... 325/430, 433, 446, 418, 325/419, 420, 421, 308; 331/32, 38; 178/5.1

[56] References Cited

UNITED STATES PATENTS

| | | | |
|---|---|---|---|
| 2,498,242 | 2/1950 | Boykin | 331/38 |
| 2,961,533 | 11/1960 | Martin | 331/38 |
| 3,387,082 | 6/1968 | Farber | 178/5.1 |

*Primary Examiner*—Richard A. Farley
*Assistant Examiner*—S. C. Buczinski
*Attorney, Agent, or Firm*—Kinzer, Plyer, Dorn & McEachran

[57] ABSTRACT

A cable television converter is used with a cable system that transmits a pilot signal, which is harmonically related to the desired converter IF signal, along with the video and sound frequency carriers for each TV channel. The converter includes phase locked loop means connected to the converter input for producing an output signal locked to the carrier frequency of the particular selected channel. The converter also includes pilot signal conversion means which produces as an output signal the difference between the IF frequency and the output signal of the phase locked loop means. A mixer combines the output signal from the pilot signal conversion means with the modulated carrier frequency to provide the desired converter IF signal.

13 Claims, 5 Drawing Figures

CABLE CONVERTER WITH PHASE LOCK LOOP TECHNIQUES

SUMMARY OF THE INVENTION

The present invention relates to cable television converters and particularly to a converter that utilizes a phase locked loop and a pilot carrier to produce a stable converter output frequency.

Another object is a converter that utilizes a phase locked loop to obtain an unmodulated carrier signal.

Another object is a converter that utilizes a transmitted pilot carrier in a single conversion cable converter.

Another object is a converter that utilizes an FM modulated carrier that is properly coded to connect or disconnect any television subscriber from the cable television signal.

Another object is a cable converter that utilizes various transmitted pilot signals to provide a disconnect or connect signal to special groups of subscribers.

Another object is a converter that utilizes amplitude modulation of the transmitted pilot signal to provide a connect or disconnect signal to any subscriber on the cable.

Another object is a converter that utilizes a transmitted pilot carrier to provide sync pulses for pay television programming.

Other objects will appear from time to time in the ensuing specification, drawings and claims.

BRIEF DESCRIPTION OF THE INVENTION

In a conventional CATV converter signals are converted to a given IF frequency $Fi$ by mixing the transmitted carrier frequency Fv with a local oscillator frequency $Fo$ in a conventional mixer. The oscillator generates an $Fo$ signal which may be defined as the absolute value of $(Fi - Fv)$. The oscillator should be stable and, if possible, quartz crystal controlled. In order to prevent reversing of the sequence of the sound and video frequencies after conversion, it is necessary that the IF frequency $Fi$ be the sum of $Fv$ and $Fo$ as long as the carrier frequency $Fv$ is less than the IF frequency $Fi$ and that the IF signal be the difference of $Fv$ and $Fo$ when $Fv$ is greater than $Fi$. When $Fv$ equals $Fi$, the mixer should act as an amplifier. These conditions can be met in mixers which provide sums, differences and input signals with the output filtering accepting only the desired $Fi$. The oscillator should generate as many frequencies as there are channels available in the cable television network.

Figure 1:
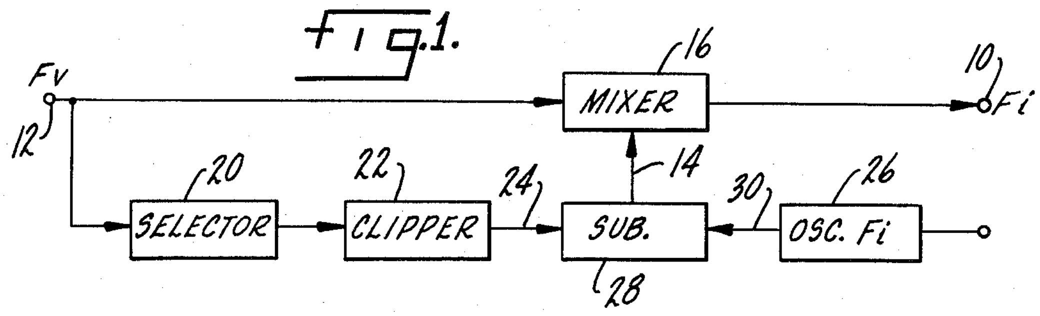
FIG. 1 is a block diagram representation of a converter that utilizes the transmitted carrier and a local oscillator to privide the utput IF frequency.

In the CATV converter of FIG. 1, when the carriers of the input signal $Fv$ 12 are stable, these frequencies can be used for generating the conventional oscillator frequency $Fo$ at 14. This can be accomplished by passing the input signal 12 through a selector 20, removing the modulation by further processing through a clipper circuit 22, and subtracting the unmodulated carrier at 24 from a signal $Fi$ provided by a crystal oscillator source 26. The output 30 from source 26 goes to a subtractor circuit 28 to obtain the desired $Fo$ signal 14 of FIG. 1. Mixer 16 then combines the carrier signal $Fv$ 12 and the absolute value of $(Fv - Fi)$ at 14 to produce the desired IF output $Fi$ 10. However, undesirable effects may result if the signal from oscillator 26 radiated directly into the IF circuitry connected to the IF output 10.

Figure 2:
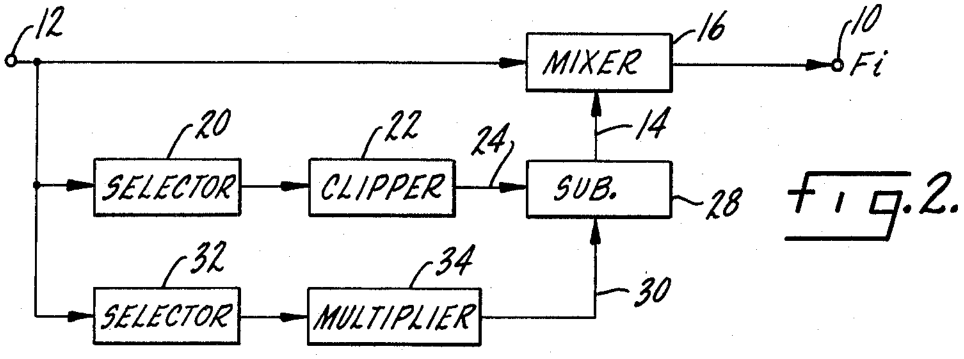
FIG. 2 is a block diagram representation of a portion of a converter that utilizes the transmitted carrier and the transmitted pilot signal to obtain the IF output frequency.

In order to solve this problem, the oscillator 26 may be eliminated by the use of a pilot signal transmitted with the carrier signal at 12, as shown in FIG. 2. The transmitted pilot signal is at a frequency $Fi/N$ to prevent direct radiation into the output networks. The pilot signal at the input 12 is processed through a selector 32 and a frequency multiplier 34 to reconstruct the desired $Fi$ signal 30 as an input to the subtractor 28. The difficulty involved in obtaining an unmodulated frequency $Fv$ at 24 may be avoided by using a phase locked loop technique. The difficulty involved in obtaining the unmodulated frequency $Fv$ is the complexity and cost of the clipper 22.

Figure 3:
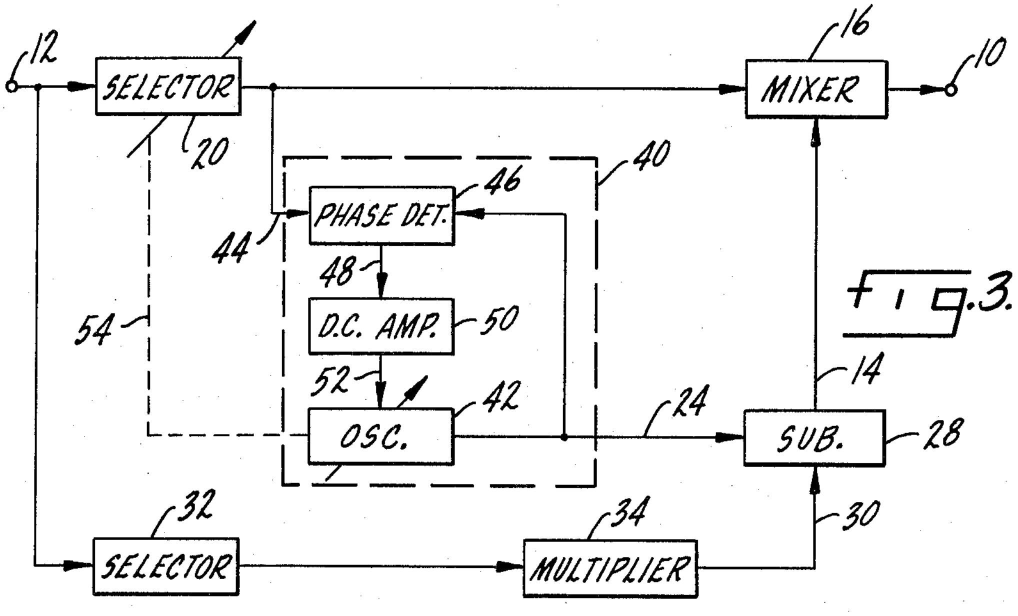
FIG. 3 is a block diagram representation of the invention that utilizes a phase locked loop and a transmitted pilot signal to produce the output IF frequency.

The present invention, FIG. 3, utilizes a phase locked loop 40 that locks a free running oscillator 42 within a narrow range of the input carrier $Fv$. The phase locked loop 40 of FIG. 3 replaces the clipper 22 of the circuit of FIG. 2. The remaining portions of FIGS. 2 and 3 are identical, except that the selector has been placed in the input line to the mixer 16. The output of the $Fv$ selector 20 is connected to the input 44 of the phase detector 46 of the phase locked loop 40. The output 24 of the free running oscillator 42 of the phase locked loop also provides an input to the phase detector 46. The phase detector phase compares the free running oscillator frequency 24 and the $Fv$ frequency from input 44 and has a DC output 48 that is proportional to the phase difference between the two inputs 24 and 44. The output 48 of phase detector 46 is amplified by a DC amplifier 50 and connected to the oscillator 42 at 52 to correct the phase error of the free running oscillator 42. Operating as a conventional narrow band phase locked loop, the loop 40 locks the oscillator 42 to the carrier $Fv$ while also removing the modulation from the carrier. With the use of the phase locked loop 40 and the transmitted pilot signal $Fi/N$, oscillator leakage into the cable will not cause fishbone patterns because the oscillator is locked to the carrier $Fv$ and will merely vectorially add to it. The pre-selector 20 is not necessary, but may be used in order to increase the sensitivity of the phase locked loop 40, to decrease radiation into the cable, and to increase cross modulation performance as well as decrease the noise figure. Tracking problems between the pre-selector 20 and the oscillator circuits within the phase locked loop 40 may be eliminated by having common tuning indicated at 54 such that the pre-selector 20 and the oscillator 42 are tuned to the same frequency as various channels are selected by channel selection means not shown.

Using various pilot frequencies $Fi/N$ and different output frequencies $Fi$ 10, an addressing system for special districts might be accomplished by assigning different output frequencies to those districts. This could be utilized where special programming such as for medical or educational groups is desired. The appropriate pilot F*i*/N frequency for the district to be addressed corresponding to that particular output frequency F*i* 10 is transmitted along with the programming information.

Figure 4:
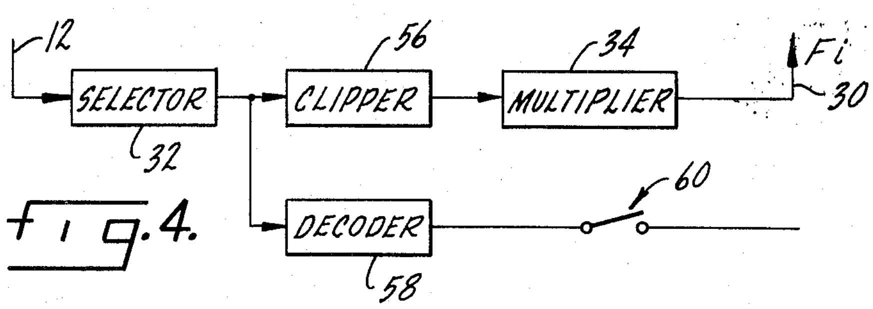
FIG. 4 is a block diagram representation of a modified portion of FIG. 3.

Modulation of the pilot F*i*/N by the use of a special code may be utilized in order to disconnect any converter from the network. This is accomplished by the circuit of FIG. 4, a modification to the circuit of FIG. 3. The output of the F*i*/N selector 32 is connected to a clipper 56 and a decoder 58. The output of the clipper 56 would then continue through the multiplier 34 with the resultant unmodulated F*i* signal at 30. The clipper 56 is now necessary since F*i* is a modulated signal. The decoder 58 operates in response to the modulation on the pilot signal F*i*/N and may operate an electrical switch 60 or other suitable connect or disconnect means. Various conventional modulation techniques may be utilized to develop a combination of special codes to disconnect an individual or groups of converters from the network.

For pay television networks, the carrier sync pulses may be eliminated from the carrier F*v* and placed on the pilot F*i*/N for restoration. Converters without the F*i* reconstruction means of FIG. 4 will not decode the carrier sync pulses.

Figure 5:
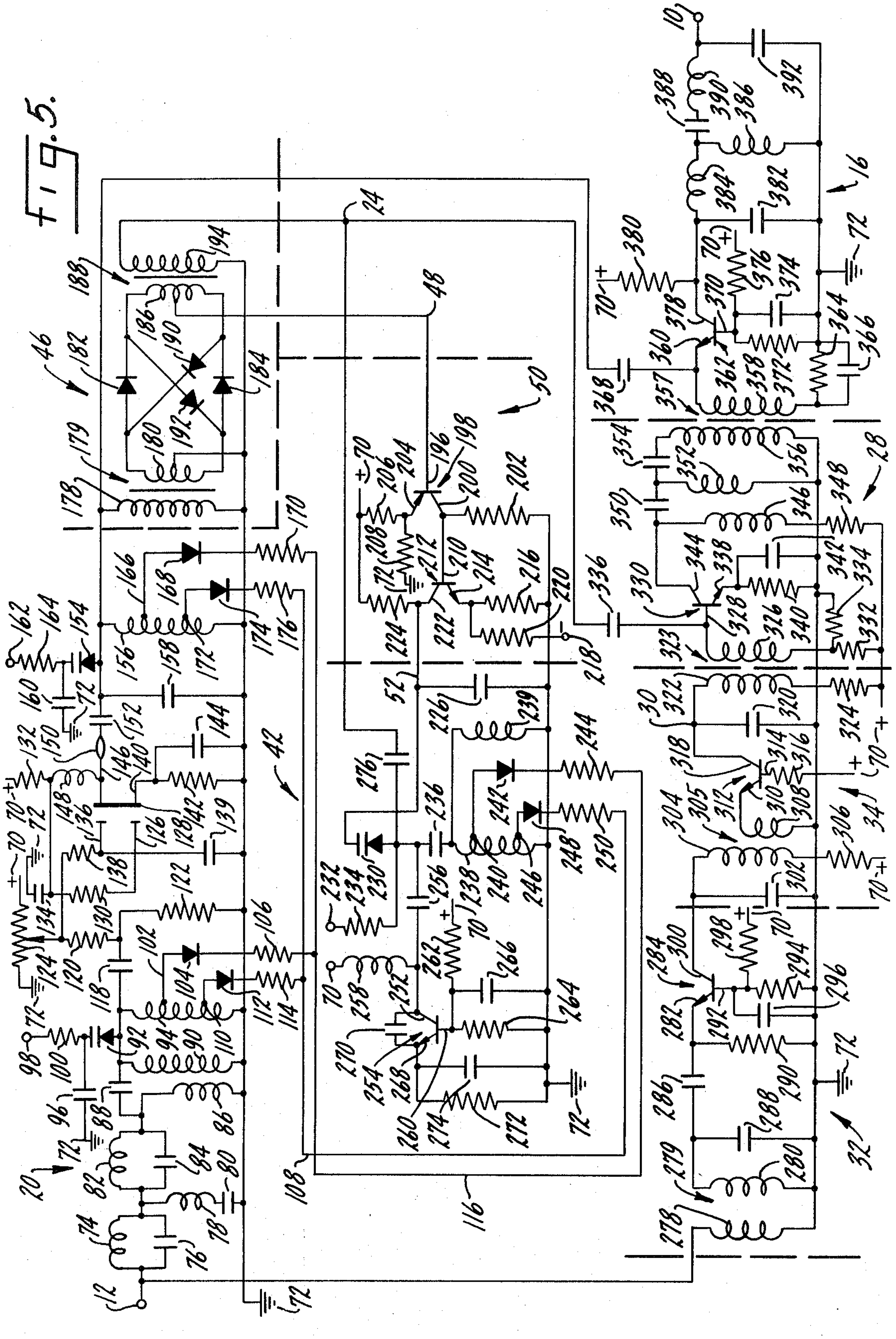
FIG. 5 is an electrical circuit diagram of the converter of FIG. 3.

An electrical circuit diagram of the converter of FIG. 3, utilizing phase locked loop techniques, is shown in FIG. 5. The input of the pre-selector 20 is the input 12 of the converter. The operable circuit has a DC supply voltage 70 and a ground line 72. The F*v* pre-selector 20 includes a parallel combination of an inductor 74 and a capacitor 76 connected to the input 12. The other end of the parallel combination is connected through a series combination of a coil 78 and a capacitor 80 to ground 72. Also connected at the junction of the parallel and series combinations is another parallel LC network including an inductor 82 and a capacitor 84. The other end of the parallel combination is connected to ground through the primary winding 86 of a transformer. A coupling capacitor 88 is connected between the primary winding 86 and a secondary winding 90. The secondary winding has its opposite end connected to ground 72. Connected to the junction of the coupling capacitor 88 and the secondary winding 90 is the anode of a variable capacitance diode 92 and one end of a tapped coil 94, whose other end is connected to ground. The cathode of the variable capacitance diode is connected to ground through a by-pass capacitor 96 and to a tuning voltage adjustment 98 through resistor 100. A first tapped point 102 of the tapped coil 94 is connected to the anode of a diode 104 whose anode is connected through a resistor 106 to a first switched line 116 that is controlled by the channel selection means, which is not shown. A second tapped point 110 of the coil 94 is connected to the anode of a diode 112, whose cathode is connected through a resistor 114 to a second switched line 108. The junction of coil 94 and diode 92 is connected through a coupling capacitor 118 to the junction of two resistors 120 and 122. The other end of resistor 122 is connected to ground 72. The other end of resistor 120 is connected to the wiper arm of a gain adjustment potentiometer 124 that is connected between the voltage supply 70 and ground 72. The junction of resistors 120 and 122 is connected to a first gate lead 126 of a dual gate FET 128 and through series bias resistors 130 and 132 to the voltage supply 70. The junction of bias resistors 130 and 132 is connected to ground through a by-pass capacitor 134. The second gate lead 136 of FET 128 is connected through a bias resistor 138 to the wiper arm of the gain adjustment potentiometer 124. The gate lead 136 is also connected to ground through a capacitor 139. The source 140 of FET 128 is connected to ground through the parallel combination of a resistor 142 and a capacitor 144. The drain 146 of FET 128 is connected through a coil 148 to the junction of bias resistors 130 and 132. The drain 146 is also connected through the series combination of a ferrite bead 150, or other similar ferrite structure, and a coupling capacitor 152 to the anode of a variable capacitance diode 154, one end of a tapped coil 156 and to ground through a capacitor 158. The cathode of variable capacitance diode 154 is connected to ground through a capacitor 160 and to a voltage tuning line 162 through a resistor 164. The other end of the tapped coil 156 is connected to ground 72. A first tapped point 166 of the tapped coil 156 is connected to the anode of a diode 168 whose cathode is connected through a resistor 170 to the first switched line 116, described earlier. The second tapped point 172 of the tapped coil 156 is connected to the anode of a diode 174, whose cathode is connected through a resistor 176 to the second switched line 108, also described earlier. The junction of the variable capacitance diode 154 and the tapped coil 156 forms the output of the selector 20 and the input of the phase detector 46.

The input of the phase detector 46 is connected to ground 72 through a primary winding 178 of a transformer 179. The tapped secondary 180 of the transformer 179 has one end connected to the anode of a diode 182 and the other end connected to the anode of another diode 184. The primary winding 186 of a second transformer 188 is connected between the cathodes of diodes 182 and 184. A diode 190 has its cathode connected to the anode of diode 182 and its anode connected to the cathode of diode 184. A diode 192 has its anode connected to the cathode of diode 182 and its cathode connected to the anode of diode 184. The center tap of the secondary 180 of transformer 179 is connected to ground 72. The center tap of the primary winding 186 of the second transformer 188 is connected to the input 48 of the DC amplifier 50 and forms the output of phase detector 46. The secondary 194 of the transformer 188 has one end connected to ground and the other end connected to the input 24 of the subtractor stage 28.

The input 48 of the DC amplifier 50 is connected to the base 196 of a transistor 198. The collector 200 of transistor 198 is connected to ground 72 through a resistor 202. The emitter 204 of transistor 198 is connected to the DC supply 70 through a resistor 206 and to ground through a bias resistor 208. The collector 200 of transistor 198 is also connected to the base 210 of transistor 212. The emitter 214 of transistor 212 is connected to ground through a resistor 216. The emitter 214 is also connected to a negative bias supply 218 through a resistor 220. The collector 222 of the transistor 212 is connected through a resistor 224 to the DC voltage supply 70. The collector 222 is also connected to ground through a capacitor 226. The collector 222 of transistor 212 forms the output 52 of the DC amplifier 50 and the control input of the oscillator 42.

The oscillator 42 includes a variable capacitance diode 230 whose cathode is connected to the input 52 and whose anode is connected to a tuning voltage 232 through a resistor 234. Also connected to the anode of diode 230 is the series combination of a coupling capacitor 236 and a tapped coil 238 connected to ground 72. An oscillator coil 239 is connected across coil 238. A first tapped point 240 of the coil 238 is connected to the anode of a diode 242, whose cathode is connected to the switched line 116 through a resistor 244. A second tapped point 246 of the coil 238 is connected to the anode of a diode 248 whose cathode is connected to the switched line 108 through a resistor 250. The anode of variable capacitance diode 230 is also connected to the collector 252 of oscillator transistor 254 through a coupling capacitor 256. The collector 252 of oscillator transistor 254 is also connected to the voltage supply 70 through an oscillator coil 258. The base 260 of oscillator transistor 254 is connected to the DC voltage supply 70 through a bias resistor 262 and to ground 72 through the parallel combination of a bias resistor 264 and a capacitor 266. The emitter 268 of transistor 254 is connected to the collector 252 through a capacitor 270. The emitter 268 is also connected to ground through the parallel combination of a resistor 272 and a capacitor 274. The anode of variable capacitance diode 230 is connected through a coupling capacitor 276 to the oscillator output 24, which is also the Fv input to the subtractor amplifier 28.

The input 12 of the converter is processed through a pilot signal selector 32. The selector 32 includes a primary winding 278 of an input transformer 279 connected from the input 12 to ground 72. The secondary winding 280 of the transformer 279 is connected to ground at one end and connected to the emitter 282 of selector transistor 284 through a coupling capacitor 286. A capacitor 288 is connected across the secondary winding 280. The emitter 282 of transistor 284 is also connected to ground through a resistor 290. The base 292 of transistor 284 is connected to ground through the parallel combination of a resistor 294 and a capacitor 296. The base 292 is also connected to the DC voltage supply 70 through a resistor 298. The collector 300 of transistor 284 forms the output of the pilot selector 32 and is connected to the input of the multiplier stage 34 at the junction of a capacitor 302 and the primary winding 304 of a multiplier input transformer 305. The other end of capacitor 302 is connected to ground 72. The other end of primary winding 304 is connected to the DC voltage supply 70 through a resistor 306. A secondary winding 308 of the multiplier input transformer 305 is connected to the emitter 310 of the multiplier transistor 312. The base 314 of doubler transistor 312 is connected to the DC voltage supply 70 through a resistor 316. The collector 318 of transistor 312 is connected to ground through a capacitor 320. The collector 318 also forms the output 30 of the multiplier circuit 34 and the Fi input to the subtractor amplifier 28.

The F*i* input 30 to subtractor amplifier 28 is connected to one end of a primary winding 322 of a multiplier output transformer 323 whose other end is connected to the DC voltage supply 70 through a resistor 324. The secondary winding 326 of the subtractor input or multiplier output transformer 323 has one end connected to the base 328 of the amplifier transistor 330. The other end of the secondary winding 326 is connected to the DC voltage supply 70 through a resistor 332. The junction of the resistor 332 and the secondary winding 326 is also connected to ground through a resistor 334. The base 328 of the subtractor amplifier transistor 330 is also connected to the F*v* input 24 through a coupling capacitor 336. The emitter 338 of transistor 330 is connected to ground 72 through the parallel combination of resistor 340 and a capacitor 342. The collector 344 of transistor 330 is connected to one end of a coil 346, whose other end is connected to the voltage supply 70 through a bias resistor 348. The collector 344 is also connected through a coupling capacitor 350 to a coil 352, whose other end is grounded. The junction of capacitor 350 and coil 352 is connected through another coupling capacitor 354 to the primary winding 356 of the mixer input transformer 357. The other end of the primary winding 356 is connected to ground 72.

The secondary winding 358 of the mixer input transformer 357 forms the output of the subtractor amplifier 28 and the absolute value of (F*i* − F*v*) input to the mixer 16. One end of the secondary winding 358 is connected to the emitter 360 of a mixer transistor 362. The other end of the secondary winding 358 is connected to ground through the parallel combination of a resistor 364 and a capacitor 366. The emitter 360 of transistor 362 is also connected through a coupling capacitor 368 to the output of the F*v* selector 20, formed by the junction of variable capacitance diode 154 and capacitor 158. The base 370 of mixer transistor 362 is connected to ground through the parallel combination of a resistor 372 and a capacitor 374 and is also connected to the DC voltage supply 70 through a resistor 376. The collector 378 of transistor 362 is connected to the DC voltage supply 70 through a resistor 380. The collector 378 is also connected to an IF output network at the junction of a capacitor 382 and a coil 384. The other end of the capacitor 382 is connected to ground 72. The other end of the coil 384 is connected to the junction of another coil 386 and a capacitor 388. The other end of the coil 386 is connected to ground. The other end of the capacitor 388 is connected to the IF output 10 through a coil 390. A capacitor 392 is connected between the IF output 10 and ground 72.

The F*v* pre-selector stage 20 and the oscillator stage 42 are of conventional design and are tracked together by tuning voltages 98, 162 and 232. The tuning voltages 98, 162 and 232 may be connected in common and supplied from channel selection circuitry, not shown. As the converter is tuned over the frequency range of the various channels in the network, the tuning voltage is varied to the various variable capacitance diodes 92, 154 and 230 to tune the pre-selector 20 and the oscillator 42. The switched tuning lines 108 and 116 also control the tuning of the pre-selector 20 and the oscillator 42 by switching in various coil inductances of the coils 94, 156 and 238. The switched tuning lines 108 and 116 may also be controlled by the channel selector means or other circuitry. The tuning variations for the various tuned circuits in the pre-selector 20 and the oscillator 42 due to component tolerances may be eliminated by utilizing tunable elements in the circuits.

The phase detector 46 and the DC amplifier 50 are also of conventional design for a phase locked loop application. The phase detector 46 provides frequency and phase information of the difference between the received carrier Fv and the oscillator free running frequency and processes the phase and frequency information so as to lock the oscillator circuit 42 to the received carrier Fv. The phase locked loop 40 formed by the phase detector 44, the DC amplifier 50 and the oscillator 42 has a narrow bandwidth so as to remove the modulation of the received carrier Fv to achieve the desired unmodulated signal Fv at 24, the input of the subtractor amplifier 28. The Fi/N or pilot selector 32 is fixed tuned since the Fi/N frequency is constant for a given system. The multiplier circuit 34 is of conventional design with tuned input and tuned output transformers 305 and 323 to produce the Fi signal at 30 the input to the subtractor 28. The subtractor amplifier 28, functioning as a difference mixer, produces the output frequency which is the absolute value of $Fi - Fv$ for the desired input to the mixer 16. Due to the frequencies used, the bandwidth of the subtractor amplifier 28 must be extremely broad. The mixer 16 is also of conventional design and produces the Fi output 10 by mixing the output of subtractor amplifier 28 and the carrier frequency Fv from the selector 20 by selecting the proper sum or difference frequency by means of the output network of the mixer 16 which is tuned to the IF output frequency.

In a typical system, the Fv carrier frequency might be in the range of 55 to 241 MHz. With an Fi or IF output frequency of 181 MHz, the Fi/N transmitted pilot signal is then 90.5 MHz. It should be understood that the Fv or video carrier signal is used in the example, but corresponding Fs or sound frequencies are also recovered by the system and are contained in the 4 MHz bandwidth allotted for each channel. For example, the video and sound frequencies for typical channels might be in the range of 55 to 59 for one channel and 241 to 245 for another channel. For a channel frequency of 181 to 185 MHz, the subtractor which produces the signal which is the absolute value of $Fi - Fv$, will produce no output and the mixer 16 will then act as an amplifier. If the selector channel is 55 MHz, the $Fi - Fv$ output is 126 MHz or 181 minus 55. The output network of the mixer 16 then selects the sum mixing product 126 MHz plus 55 MHz or 181 MHz. The corresponding sound frequency would be 126 plus 59 MHz or 185 MHz. It should be noted that the video and sound sequence with the sound above the video frequency is preserved. If the channel selected is 241 MHz for the video frequency, $Fi - Fv$ will equal 60 MHz or the absolute value of 181 minus 241. The subtractor amplifier 28 actually produces both sum and difference frequencies, although the sum frequency would be somewhat attenuated due to the output tuning of the subtractor amplifier 28. The sum products produced by the subtractor 28 would be in the range of 236 to 422 MHz for video frequencies of 55 to 241 MHz, while the output bandwidth of the subtractor 28 is approximately 150 MHz, producing frequencies of 0 to 126 MHz for a minimum video frequency of 55 MHz. The mixer 16 generates sum frequencies, difference frequencies and, also, input signals. The output filter network of the mixer 16, formed by capacitors 382, 388 and 392 and inductors 384, 386 and 390 accepts only the desired IF output signal, which in this example is 181 MHz. However, it should be understood that other IF output frequencies might also be utilized as well as various received carrier frequencies.

The converter of FIGS. 3 and 5, utilizing a phase locked loop technique, utilizes the stable transmitted carrier frequencies to produce a stable converter output frequency, the IF output. THe use of a transmitted pilot signal makes the use of a single conversion system possible. The use of different pilot frequencies provides disconnect or connect information for special network programming to the desired groups. Amplitude modulation of the pilot signal could provide a disconnect or connect to any subscriber from the cable. Carrier frequency shift-keying or FM modulation of the carrier results in AM signals at the output of the DC amplifier 50 and the phase locked loop 40 so that these signals might be used in a pay television system for switching the subtractor stage 28 on or off. Further use of the pilot signal for synchronization pulses also provides pay television programs with the sync pulses being eliminated from the video carrier. The use of the phase locked loop technique produces the necessary unmodulated carrier Fv which, in combination with the reconstructed Fi from the pilot carrier Fi/N, produces the IF output frequency at 10. The local oscillator producing the $Fi - Fv$ frequency in a conventional converter has been eliminated by the use of the phase locked loop technique. The stability requirements of the local oscillator in a conventional converter producing a stable output frequency for each channel in the network over a wide frequency range makes the elimination of such an oscillator very desirable.

Whereas the preferred form of the invention has been shown and described herein, it should be realized that there may be many modifications, substitutions and alterations thereto.

I claim:

1. In a cable television converter having channel selection means associated with a system that transmits a pilot signal which is harmonically related to the desired IF signal along with the video and sound frequency carrier received at the input of said converter for each TV channel, phase locked loop means (PLLM) connected at the input of said converter for producing an output signal locked to the carrier frequency for the selected channel, pilot signal conversion means (PSCM) having two inputs, the first of said inputs being connected to the input of said converter, the second of said inputs being connected to the output signal of said PLLM, said PSCM producing an output signal which is the difference between the IF frequency and the output signal of said PLLM, and combining means having two inputs, the first of said inputs being connected to the modulated carrier frequency, the second of said inputs being connected to the output signal of said PSCM, said combining means processing said input signals to produce a constant IF output signal.

2. The circuit of claim 1 further characterized in that said IF output signal of said combining means is a constant frequency for all channels selected.

3. The circuit of claim 2 further characterized in that said pilot signal is a predetermined constant frequency for all channels selected.

4. The circuit of claim 3 further characterized in that said PLLM includes pre-selector circuit means and oscillator circuit means, said pre-selector circuit means being connected at the input of said converter and being tracked so as to tune with said oscillator circuit means.

5. The circuit of claim 4 further characterized in that said pilot signal is equal to a submultiple of the IF output frequency.

6. The circuit of claim 1 further characterized in that said PLLM includes a phase detector, a DC amplifier and an oscillator, said phase detector including an output and two inputs connected to compare said oscillator frequency and said carrier frequency for the selected channel, said DC amplifier being connected to the output of said phase detector having an output connected so as to control the frequency of said oscillator.

7. The circuit of claim 1 further characterized in that the frequency of said pilot signal and said IF frequency is different in various converters to achieve an address code for special areas or groups.

8. The circuit of claim 7 further characterized in that said PSCM includes a decoding means connected at the input of said converter, said decoding means being arranged to provide a disconnect signal when a given code is sent to disconnect the converter from the system.

9. The circuit of claim 8 further characterized in that said PSCM includes clipper means connected at the input of said converter to remove said modulation on the pilot signal for use in producing the output signal equal to the difference between the IF frequency and the output signal of the PLLM so as not to pass the modulation on the pilot signal to said IF output of the combining means.

10. The circuit of claim 6 further characterized in that conventional carrier sync pulses are deleted from the carrier signal and transmitted with the pilot signal for a pay television system.

11. The circuit of claim 6 further characterized in that the carrier signal is FM modulated and in that said PLLM includes decoding means for a pay television system to switch said PSCM on and off by processing the output signal of said DC amplifier.

12. The circuit of claim 1 further characterized in that said PSCM includes a selector and a multiplier, said selector being connected to said converter input and said multiplier being connected to said selector.

13. The circuit of claim 12 further characterized in that said PSCM includes a subtraction circuit, one input of said subtraction circuit being connected to said multiplier and the other input being connected to said PLLM, the output of said subtraction circuit being connected to said combining means.

* * * * *